(12) United States Patent
Rao et al.

(10) Patent No.: US 12,718,457 B2
(45) Date of Patent: Aug. 25, 2026

(54) MULTICORE SYSTEM FOR NEURAL RENDERING

(71) Applicant: SHANGHAITECH UNIVERSITY, Shanghai (CN)

(72) Inventors: Chaolin Rao, Shanghai (CN); Minye Wu, Shanghai (CN); Xin Lou, Shanghai (CN); Pingqiang Zhou, Shanghai (CN); Jingyi Yu, Shanghai (CN)

(73) Assignee: SHANGHAITECH UNIVERSITY, Shanghai (CN)

( * ) Notice: Subject to any disclaimer, the term of this patent is extended or adjusted under 35 U.S.C. 154(b) by 336 days.

(21) Appl. No.: 18/531,755

(22) Filed: Dec. 7, 2023

(65) Prior Publication Data

US 2024/0104822 A1 Mar. 28, 2024

Related U.S. Application Data

(63) Continuation of application No. PCT/CN2021/130765, filed on Nov. 15, 2021.

(51) Int. Cl.
*G06T 15/00* (2011.01)
*G06T 7/90* (2017.01)

(52) U.S. Cl.
CPC .............. *G06T 15/005* (2013.01); *G06T 7/90* (2017.01); *G06T 2207/20084* (2013.01)

(58) Field of Classification Search
CPC ......... G06T 15/005; G06T 7/90; G06T 15/06; G06T 2207/20084
See application file for complete search history.

(56) References Cited

U.S. PATENT DOCUMENTS

| | | | | |
|---|---|---|---|---|
| 2016/0018498 | A1 * | 1/2016 | Boernert | G01R 33/34092 324/309 |
| 2020/0042867 | A1 | 2/2020 | Shao | |
| 2022/0301257 | A1 * | 9/2022 | Garbin | G06T 15/506 |
| 2022/0358627 | A1 * | 11/2022 | Deng | G06N 3/09 |
| 2022/0414928 | A1 * | 12/2022 | Venkataraman | G06V 10/82 |

FOREIGN PATENT DOCUMENTS

CN 112116084 A 12/2020

OTHER PUBLICATIONS

Ben Mildenhall, et al., NeRF: Representing Scenes as Neural Radiance Fields for View Synthesis, arXiv:2003.08934v2 [cs.CV],, 2020, pp. 1-25.

* cited by examiner

*Primary Examiner* — Michelle Chin
(74) *Attorney, Agent, or Firm* — Bayramoglu Law Offices LLC

(57) ABSTRACT

An image rendering system comprising a preprocessing unit coupled to a feature extract unit and a color rendering unit over a data bus. The preprocessing unit generates vector representations of spatial coordinates of sample points along camera rays corresponding to pixels of an image to be rendered. The feature extract unit generates a feature map of the image based on the vector representations, color and intensity values of the sample point through a first machine learning model. The color rendering unit renders the image based on the feature map through a second machine learning model. The first machine learning model is different from the second machine learning model.

14 Claims, 9 Drawing Sheets

100

150

MULTICORE SYSTEM FOR NEURAL RENDERING

CROSS REFERENCE TO RELATED APPLICATIONS

This application is a continuation application of International Application No. PCT/CN2021/130765, filed on Nov. 15, 2021, the entire contents of which are incorporated herein by reference.

TECHNICAL FIELD

The present invention generally relates to computing systems for image rendering. More particularly, the present invention relates to a multicore computing system to perform neural network-based image rendering.

BACKGROUND

Machine learning models, such as neural networks, have made impressive strides in advancing imaging applications. For example, various machine learning models have been developed to improve image classification, object detection/recognition, image segmentation, etc. Recently, image rendering techniques based on neural radiance fields, or NeRFs, have been developed to render photorealistic images from novel viewpoints. For example, a neural radiance field can be encoded into a machine learning model, such as a neural network. The machine learning model can be trained to encode density and color values of points of the neural radiance field based on a training dataset comprising images. Once trained (i.e., encoded), the machine learning model can output, based on spatial coordinates of points along camera rays inputted into the machine learning model, density and color values of the points. Based on the density and color values, color values (i.e., RGB values) of pixels can be determined and images can be rendered. In general, rendering images based on neural radiance fields can be computationally taxing. Although there exists hardware accelerators or processors that focus on accelerating neural network computations, these solutions are mainly used for accelerating convolutional neural networks. As such, these solutions are not suitable for accelerating neural networks encoded with neural radiance fields. As such, current hardware solutions are not suitable for real-time or near real-time neural radiance field-based image rendering applications. Better solutions are needed.

SUMMARY

Described herein is an image rendering system comprising a preprocessing unit coupled to a feature extract unit and a color rendering unit over a data bus. The preprocessing unit can generate vector representations of spatial coordinates of sample points along camera rays corresponding to pixels of an image to be rendered. The feature extract unit can generate a feature map of the image based on the vector representations, color and intensity values of the points through a first machine learning model. The color rendering unit can render the image based on the feature map through a second machine learning model. The first machine learning model is different from the second machine learning model.

In some embodiments, a first signal to noise ratio (SNR) of the feature map is lower than a second signal to noise ratio (SNR) of the rendered image.

In some embodiments, the feature map comprises a coarse image, and a first signal to noise ratio (SNR) of the coarse image is lower than a second signal to noise ratio (SNR) of the rendered image.

In some embodiments, the rendered image comprises high-frequency features not present in the coarse image.

In some embodiments, wherein the first machine learning model is a multilayer perceptron.

In some embodiments, the second machine learning model can be a convolutional neural network.

In some embodiments, the feature extract unit can comprise a plurality of first processors.

In some embodiments, each of the plurality of first processors can comprise a first processor core coupled to two memory modules and a parameter memory module. The first processor core can perform matrix operations associated with the first machine learning model. The two memory modules can store input data and output data associated with the first machine learning model. The parameter memory module can store parameters associated with the first machine learning model.

In some embodiments, the two memory modules can alternatively store input data and output data associated with layers of the first machine learning model.

In some embodiments, the first processor core can comprise a multiplication array, one or more accumulation arrays, and a local cache. The multiplication array and the one or more accumulation arrays can perform matrix multiplication operations associated with the layers of the first machine learning model. The local cache can store partial sums associated with the matrix multiplication operations.

In some embodiments, the first processor core can be a computational unit associated with at least one of a central processor unit, a graphics processor unit, or a field programmable gate array.

In some embodiments, the color rendering unit can comprise a plurality of second processors.

In some embodiments, each of the plurality of second processors can comprise a second processor core coupled to a memory module and a parameter memory module. The second processor core can perform matrix operations associated with the second machine learning model. The memory module can store input data and output data associated with the second machine learning model. The parameter memory module can store parameters associated with the second machine learning model.

In some embodiments, the memory module can store input data and output data associated with layers of the second machine learning model.

In some embodiments, the second processor core can comprise a multiplication array and one or more accumulation arrays. The multiplication array and the one or more accumulation arrays can perform matrix multiplication operations associated with the layers of the second machine learning model. Partial sums associated with the matrix multiplication operations are stored in the memory module.

In some embodiments, the second main processor can be a computation unit associated with at least one of a central processor unit, a graphics processor unit, or a field programmable gate array.

These and other features of the apparatuses, systems, methods, and non-transitory computer-readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

Figure 1A:
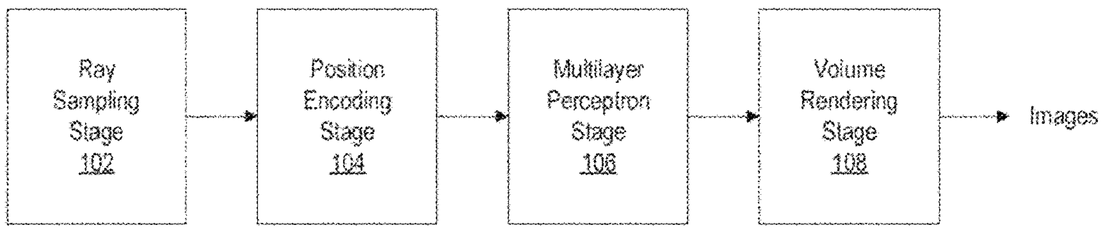
FIG. 1A illustrates an image rendering pipeline configured to render images of objects, according to various embodiments of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION OF THE EMBODIMENTS

Described herein is a solution, rooted in technology, that addresses the problems described above. In various embodiments, a computing system can be configured to render images in real-time or near real-time. The computing system, in some embodiments, can be a multicore computing system. The multicore computing system can include at least a multilayer perceptron rendering unit and a convolutional neural network rendering unit. The multilayer perceptron rendering unit can comprise a plurality of multilayer perceptron processors configured for performing computations associated with a multilayer perceptron encoded with a neural radiance field. The convolutional neural network rendering unit can comprise a plurality of convolutional neural network processors configured for performing computations associated with a convolutional neural network. These are other features of the computing system are described in further detail herein.

In various embodiments, a neural radiance field can encode a scene and/or an object using a machine learning model. For example, a neural radiance field of a scene can be encoded using a multilayer perceptron (MLP). In such embodiments, an image can be synthesized by querying the machine learning model with a set of points to sample along camera rays to obtain color and intensity values of the points. Based on the color and intensity values of the points, pixel color of the image can be determined and the image can be rendered. For example, consider FIG. 1A. FIG. 1A illustrates an image rendering pipeline 100 configured to render images of objects, according to various embodiments of the present disclosure. As shown in FIG. 1A, the image rendering pipeline 100 can comprise a ray sampling stage 102, a position encoding stage 104, a multilayer perceptron stage 106, and a volume rendering stage 108. Each of these stages will be discussed in further detail below.

In some embodiments, the ray sampling stage 102 can be configured to determine points along camera rays to sample in a neural radiance field based on coordinates of pixels of an image to be rendered. In general, a neural radiance field is a three-dimensional imaging space in which points (i.e., voxels or a unit of volume) of the three-dimensional imagining space are encoded with color and intensity values reflecting a scene and/or objects. The ray sampling stage 102 can determine spatial coordinates of camera rays associated with the pixels of the image and spatial coordinates of points along each camera ray based on the coordinates of the pixels. For example, assume that a frame of an image to be rendered comprises two pixels in width and two pixels in length for a total of four pixels. In this example, the ray sampling stage 102 can determine, based on coordinates of the four pixels, spatial coordinates of camera rays associated with the four pixels and spatial coordinates of points along each camera ray. In various embodiments, spatial coordinates of a point can be represented as a three-dimensional vector and spatial coordinates of a camera ray can be represented by a two-dimensional vector. For example, spatial coordinates of a point can be represented by $(x, y, z)$ and spatial coordinates of a camera ray can be represented as $(\theta, \varepsilon)$. In some embodiments, the ray sampling stage 102 can concatenate spatial coordinates of points and spatial coordinates of camera rays into a vector representation. For example, continuing from the example above, the ray sampling stage 102 can concatenate $(x, y, z)$ and $(\theta, \varepsilon)$ into a vector representation $(x, y, z, \theta, \varepsilon)$. The ray sampling stage 102 can provide concatenated vector representations to the position encoding stage 104 for further processing.

In some embodiments, the position encoding stage 104 can be configured to map concatenated vector representations of points and camera rays from their original dimensions to a higher dimensional space. In this way, images can be rendered with higher fidelity. For example, in some embodiments, the position encoding stage 104 can map a concatenated representation of points and camera rays from a dimension of five (i.e., 3+2) to a dimension of ten. Many variations are possible. In some embodiments, the position encoding stage 104 can use Fourier feature mapping techniques to map the concatenated vector representations to the higher dimensional space. Many other techniques may be used. Once the position encoding stage 104 maps the concatenated vector representations to the higher dimensional space, the position encoding stage 104 can provide the higher dimensional vector representation to the multilayer perceptron stage 106 to generate (i.e., query or obtain) color and intensity values of points along camera rays.

In some embodiments, the multilayer perceptron stage 106 can be configured to output color and intensity values of a set of points along a camera ray based on a higher dimensional representation of the set of points and the camera ray. In some embodiments, the multilayer perceptron stage 106 can be based on a multilayer perceptron. The multilayer perceptron can be encoded with the neural radiance field. In such embodiments, the multilayer perceptron can be queried with the higher dimensional vector representation to output color and intensity values of the set of points. Once the color and intensity values are obtained, the multilayer perceptron stage 106 can provide these values to the volume rendering stage 108 for image rendering. In some embodiments, the multilayer perceptron stage 106 can output a feature map of an image (e.g., a "coarse" image). The feature map, in some cases, can comprise a plurality of units arranged a two-dimensional grid (i.e., pixels of an image). Each of the units (i.e., pixels) can be associated with color and intensity values of points along a camera ray.

In some embodiments, the volume rendering stage 108 can be configured to render an image based on a feature map of an image comprising color and intensity values of points along camera rays. As discussed above, a camera ray can be associated with a pixel of an image. The pixel can correspond to a unit of the feature map. As such, the volume rendering stage 108 can determine a color value of a pixel based on color and intensity values of a set of points along a camera ray associated with a unit of the feature map. In some embodiments, the color value of the pixel can be determined by compositing the color and intensity values of the set of points. In other embodiments, the color value of the pixel can be determined by integrating color and intensity values of a subset of points that are associated with a surface. Many variations are possible. The volume rendering stage 108 can render an image based on color values of pixels of the image.

Although images rendered through the image rendering pipeline 100 have demonstrated a level of image fidelity on a range of challenging scenes that were previously unachieved, such image rendering techniques have issues with rendering scenes and/or objects with high-frequency surfaces, has as hair, fur, patches of grass, etc. The computing system described herein addresses the problems described above by modifying the imaging rendering pipeline 100 to replace the volume rendering stage 108 with a convolutional neural network. It has been determined that such an implementation of an imaging rendering pipeline can render high-quality images of fuzzy objects.

Figure 1B:
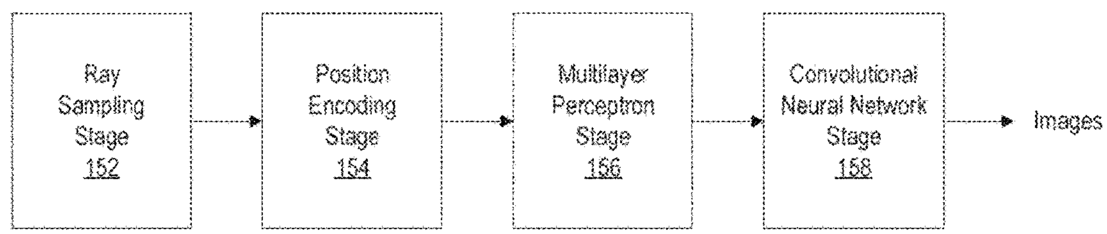
FIG. 1B illustrates a modified image rendering pipeline for rending images with fuzzy objects, according to various embodiments of the present disclosure.

FIG. 1B illustrates a modified image rendering pipeline 150 for rending images with fuzzy objects, according to various embodiments of the present disclosure. The modified image rendering pipeline 150 of FIG. 1B depicts a computation process in which images of objects with high-frequency surfaces (e.g., high-frequency features) are rendered. For example, the modified image rendering pipeline 150 can be used to render images of furry objects or highly textured objects. Unlike the image rendering pipeline 100 of FIG. 1A, the modified image rendering pipeline 150 can utilize at least two machine learning models to render high-frequency images. For example, the modified image rendering pipeline 150 can include a multilayer perceptron encoded with a neural radiance field coupled to a convolutional neural network. In this example, the multilayer perceptron can be configured to generate color and intensity values of points needed to render normal images (i.e., non-high-frequency images), while the convolutional neural network can be configured to augment the multilayer perceptron and generate detailed color and intensity values of points needed to render high-frequency images. As shown in FIG. 1B, in some embodiments, the modified image rendering pipeline 150 can comprise a ray sampling stage 152, a position encoding stage 154, a multilayer perceptron stage 156, and a convolutional neural network stage 158. Various functionalities of the ray sampling stage 152, the position encoding stage 154, and the multilayer perceptron stage 156 have been discussed above with reference to the ray sampling stage 102, the position encoding stage 104, and the multilayer perceptron stage 106 of FIG. 1A. For example, the ray sampling stage 152 can be configured to determine points along camera rays to sample in a neural radiance field based on coordinates of pixels of an image to be rendered. The ray sampling stage 152 can concatenate spatial coordinates of the points and the camera rays into vector representations. The position encoding stage 154 can be configured to map the concatenated vector representations of the points and the camera rays from their original dimensions to a higher dimensional space. The multilayer perceptron stage 156 can be configured to output color and intensity values of the points along the camera rays based on the higher dimensional vector representations. Thus, discussion relating to these stages will not be repeated herein. The convolutional neural network stage 158 will be discussed in further detail below.

The convolutional neural network stage 158 can be configured to generate detailed color and density values of points along camera rays based on color and density values of a feature map of an image provided by the multilayer perceptron stage 156. Detailed color and density values of points, as used here, can refer to color and density values of points along camera rays corresponding to pixels of a high-frequency image. In some embodiments, the convolutional neural network stage 158 can be based on a convolutional neural network. The convolutional neural network is trained to output detailed color and density values of points based on color and density values of the feature map provided by the multilayer perceptron stage 156. The convolutional neural network 208, based on detailed color and density values of points, can render a high-frequency image. In general, the convolutional neural network can be implemented using any suitable manner. For example, the convolutional neural network can be implemented using any suitable techniques and any suitable number of layers. In some embodiments, the images rendered through the convolutional neural network stage 158 has a signal to noise ratio that is higher than images rendered through the multilayer perceptron stage 156. As such, in general, the images rendered through the convolutional neural network stage 158 would be able to show high-frequency features not visible in images rendered through the multilayer perceptron stage 156. In other words, rendering by the convolutional neural network stage 158 would improve the quality of the images.

Figure 2:
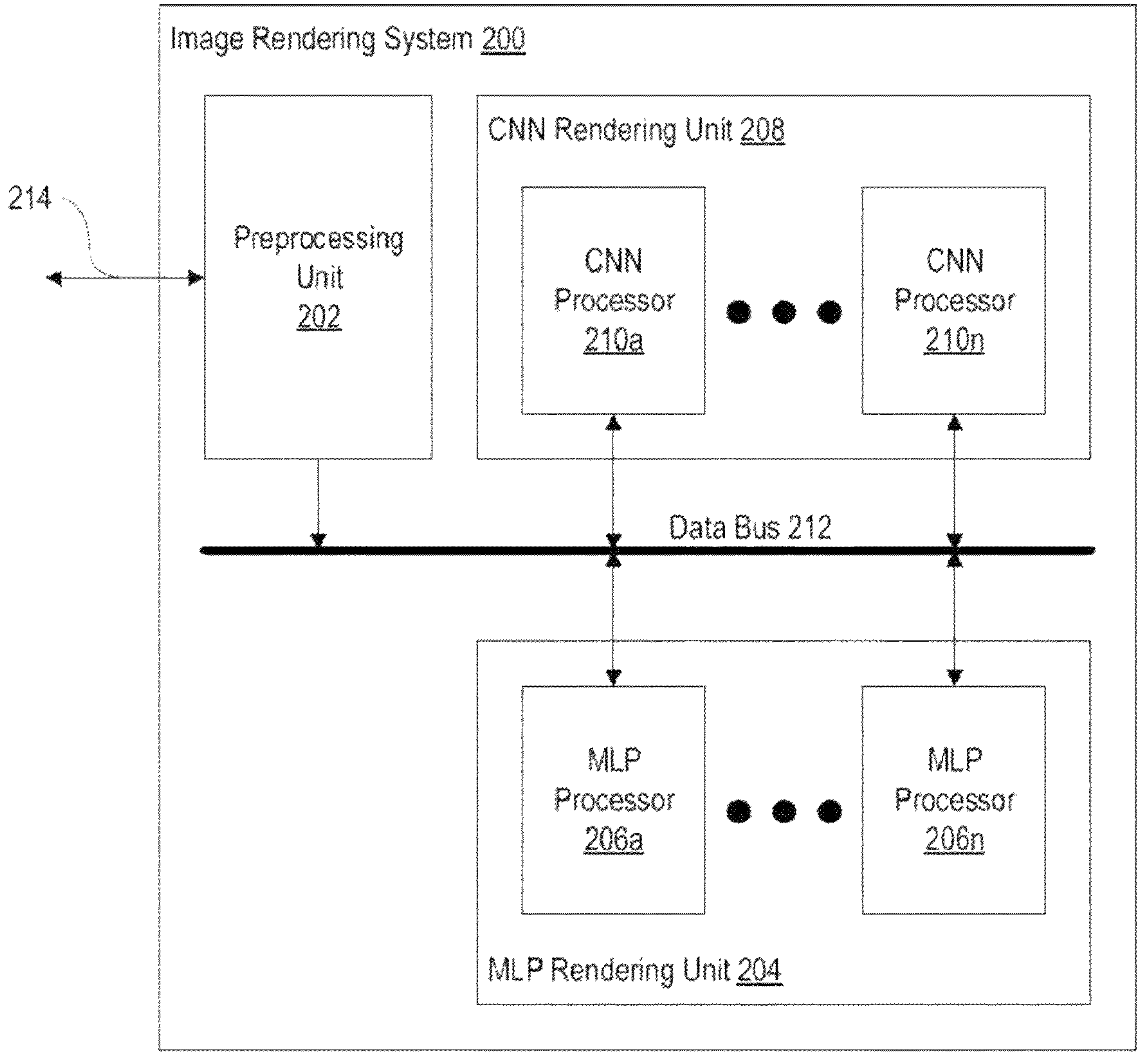
FIG. 2 illustrates an image rendering system, according to various embodiments of the present disclosure.

FIG. 2 illustrates an image rendering system 200, according to various embodiments of the present disclosure. In some embodiments, the image rendering system 200 can be configured to implement the modified image rendering pipeline 150 of FIG. 1B. For example, the image rendering system 200 can be programmed or configured to render fuzzy objects or highly textured objects through the modified image rendering pipeline 150. In various embodiments, the image rendering system 200 can be implemented using one or more computing systems. For example, in some embodiments, the image rendering system 200 can be implemented using central processor unit-based and/or graphics processor unit-based computing systems. In other embodiments, the image rendering system 200 can be implemented using field programmable gate array-based computing systems. Many variations are possible and contemplated. As shown in FIG. 2, in some embodiments, the image rendering system 200 can include a preprocessing unit 202, a multilayer perceptron (MLP) rendering unit 204, and a convolutional neural network (CNN) rendering unit 208 connected or coupled to one another over a data bus 212. Through the data bus 212, the preprocessing unit 202, the MLP rendering unit 204, and the CNN rendering unit 208 can transmit/receive data, or otherwise communicate, with one another. In various embodiments, the data bus 212 can be implemented using any suitable data buses or transmission protocols. For example, in some embodiments, the data bus 212 can be a peripheral component interconnect express (PCIe) bus. In other embodiments, the data bus 212 can be an ethernet-based connection. The preprocessing unit 202, the MLP rendering unit 204, and the CNN rendering unit 208 will be discussed in further detail below.

In some embodiments, the preprocessing unit 202 can generate spatial coordinates of points along camera rays to sample in a neural radiance field based on coordinates of pixels of an image to be rendered. Based on the coordinates of the pixels, the preprocessing unit 202 can determine the spatial coordinates of the points and the camera rays. The preprocessing unit 202 can then concatenate the spatial coordinates of the points and the camera rays into vector representations. These concatenated vector representations can be mapped, by the preprocessing unit 202, to a higher dimensional space. In other words, the preprocessing unit 202 can be configured or programmed to perform functions of the ray sampling stage 152 and the position encoding stage 154 of FIG. 1B. In some embodiments, the preprocessing unit 202 can interface with a data path 214 external to the image rendering system 200. Through the data path 214, the preprocessing unit 202 can receive instructions (i.e., data) relating to an image to be rendered. For example, the preprocessing unit 202 can receive data relating to a viewpoint or perspective of the image (i.e., coordinates of pixels) through the data path 214. In such embodiments, the preprocessing unit 202 can sequentially read the instructions and generate, based on the instructions, spatial coordinates of points to sample along camera rays in a neural radiance field. In some embodiments, the instructions relating to the images can be stored in off-chip dynamic random access memory (DRAM) or other suitable off-chip memory storage devices accessible by the image rendering system 200. As discussed, the spatial coordinates of the points and the camera rays are concatenated and mapped to a higher dimensional space prior to further processing.

In some embodiments, the MLP rendering unit 204 can generate, based on a neural radiance field, a feature map of an image comprising color and intensity values of points along camera rays associated with pixels of images to be rendered. In other words, the MLP rendering unit 204 can be configured or programmed to perform functions of the multilayer perceptron rendering stage 156 of FIG. 1B. In some embodiments, the MLP rendering unit 204 can encode a neural radiance field into a multilayer perceptron based on a training dataset comprising images. Once the neural radiance field is encoded, the MLP rendering unit 204 can output a feature map based on high dimensional vector representations provided by the preprocessing unit 202 through the data bus 212. In such embodiments, the MLP rendering unit 204 can query the neural radiance field to generate the color and intensity values of the points and provide the points as the feature map to the CNN rendering unit 208. As shown in FIG. 2, in some embodiments, the MLP rendering unit 204 can comprise a plurality of MLP processors 206*a*-206*n*. The plurality of MLP processors 206*a*-206*n* can be dedicated to processing the high dimensional vector representations through neural layers of the multilayer perceptron to output the color and intensity values of the points. In such embodiments, each of the plurality of MLP processors 206*a*-206*n* can perform computations of a high dimensional vector representation through the multilayer perceptron. In general, because each of the high dimension vector representations is an independent vector, the plurality of MLP processors 206*a*-206*n* can be configured to parallelly process the high dimension vector representations to output color and density values of points of a feature map. As a general rule, the more MLP processors the MLP rendering unit 204 has, the faster the MLP rendering unit 204 can output color and density values of points. In various embodiments, a feature map generated by the MLP rendering unit 204 can have a low signal to noise ratio (SNR). In this regard, a low SNR means images of lower visual quality. The plurality of MLP processors 206*a*-206*n* will be discussed in further detail with reference to FIG. 3A herein.

In some embodiments, the CNN rendering unit 208 can generate detailed color and intensity values of points along camera rays associated with pixels of images to be rendered. In other words, the CNN rendering unit 208 can be configured or programmed to perform functions of the convolutional neural network rendering stage 158 of FIG. 1B. In some embodiments, the CNN rendering unit 208 can generate detailed color and intensity values of points based on a convolutional neural network. The convolutional neural network can be trained to output the detailed color and intensity values of points based on "coarse" color and intensity values of points of a feature map outputted by the MLP rendering unit 204. The CNN rendering unit 258 can access the "coarse" color and intensity values through the data bus 212. As shown in FIG. 2, in some embodiments, the CNN rendering unit 208 can comprise a plurality of CNN processors 210*a*-210*n*. The plurality of CNN processors 210*a*-210*n* can be dedicated to processing "coarse" color and intensity values of points through neural layers of the convolutional neural network to output detailed color and intensity values of the points. In such embodiments, each of the plurality of CNN processors 210*a*-210*n* can process the "coarse" color and intensity values of points through the convolutional neural network. In general, the plurality of CNN processors 210*a*-210*n* can operate on multiple "coarse" color and intensity values of points. As such, in various embodiments, a number of CNN processor can be less than a number of MLP processors. In various embodiments, an image generated by the CNN rendering unit 208 can have a high signal to noise ratio (SNR). In this regard, a high SNR means images of high visual quality. The plurality of CNN processors 210*a*-210*n* will be discussed in further detail with reference to FIG. 3B herein.

Figure 3A:
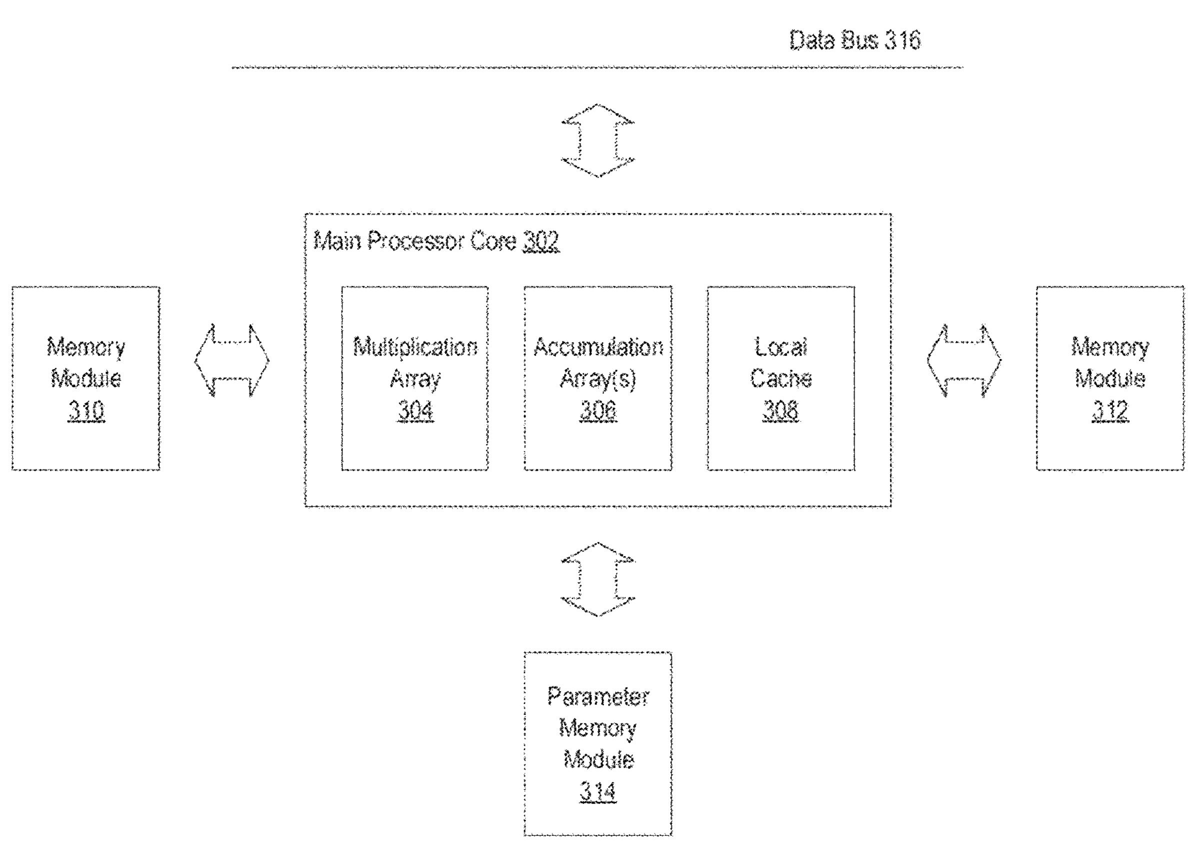
FIG. 3A illustrates a diagram of a multilayer perceptron processor, according to various embodiments of the present disclosure.

FIG. 3A illustrates a diagram of an MLP processor 300, according to various embodiments of the present disclosure. In some embodiments, each of the plurality of MLP processors 206*a*-206*n* of FIG. 2 can be implemented using the MLP processor 300. As shown in FIG. 3A, in some embodiments, the MLP processor 300 can include a main processor core 302 connected or coupled to two memory modules 310, 312 and a parameter memory module 314. The main processor core 302 can be further connected or coupled to a data bus 316 (e.g., the data bus 212 of FIG. 2) of an image rendering system (e.g., the image rendering system 200 of FIG. 2). Through the data bus 316, the main processor core 302 can read and write various data to and from other processors or processing units (e.g., the preprocessing unit 202 of FIG. 2) connected or coupled to the data bus 316. For example, the main processor core 302 can receive high dimensional vector representations through the data bus 316 from a preprocessing unit. The main processor core 302 can compute (or generate) a feature map of the image through a multilayer perceptron encoded with a neural radiance field. In this example, the main processor core 302 can write the feature map of the image to the data bus 316 so that a CNN processor can further process the feature map to generate an image. In some embodiments, the feature map generated by the multilayer perceptron can be a coarse image of lower quality or without high frequency features, while the final image generated by the CNN processor is an image of high quality or containing high frequency features.

In general, parameters associated with a multilayer perceptron encoded with a neural radiance field can include approximately 600,000 parameters (e.g., weights of the multilayer perceptron). Because a number of the parameters associated with the multilayer perceptron can be quite large, it is inefficient to store the parameters in the main processor core 302. Instead, the parameters can be stored (e.g., offloaded) to the parameter memory module 314 to improve compute efficiency of the main processor core 302. In some embodiments, the main processor core 302 can be configured to load the parameters of the multilayer perceptron prior to processing high dimensional vector representations provided by the preprocessing unit. This configuration alleviates the main processor core 302 from having to permanently store the parameters of the multilayer perceptron. In some embodiments, the memory modules 310, 312 can be configured to store data associated with computations through the multilayer perceptron. The memory modules 310, 312 can store the data in a ping-pong configuration. Under the ping-pong configuration, as an example, the memory module 310 can be configured to store data to be processed through a first neural layer of the multilayer perceptron by the main processor core 302, and the memory module 312 can be configured to store output data from the first neural layer of the multilayer perceptron. For a second neural layer of the multilayer perceptron, the memory module 312 stores input data to the second neural layer to be processed by the main processor core 302 (e.g., the output data from the first neural layer) while the memory module 310 is now configured to store output data from the second neural layer. This ping-ponging of storing data between the memory modules 310, 312 continues until all of neural layers of the multilayer perceptron are processed by the main processor core 302.

In some embodiments, the main processor core 302 can comprise a multiplication array 304, one or more accumulation arrays 306, and a local cache 308. The multiplication array 304 and the one or more accumulation arrays 306 can be configured for performing matrix multiplication operations associated with the neural layers of the MLP (e.g., processing the vector representations through the neural layers of the MLP). The local cache 308 can be configured to store partial sums associated with the matrix multiplication operations performed by the multiplication array 304 and the one or more accumulation arrays 306. In general, the main processor core 302 can be used for operating an activation function and quantization function associated with matrix computations. In some embodiments, the main processor core 302 can be implemented as a computational unit, such as an arithmetic logic unit, in a central processor unit (CPU) and its associated memory or cache. In some embodiments, the main processor core 302 can be implemented as a computational unit, such as a texture mapping unit, in a graphics processor unit (GPU) and its associated memory or cache. In some embodiments, the main processor core 302 can be implemented using custom logic programmed into field programmable gate arrays (FPGAs) or application specific integrated circuits (ASICs). Many variations are possible. Computational steps performed by the main processor core 302 of the MLP processor 300 will be discussed in further detail with reference to FIG. 4A herein.

Figure 3B:
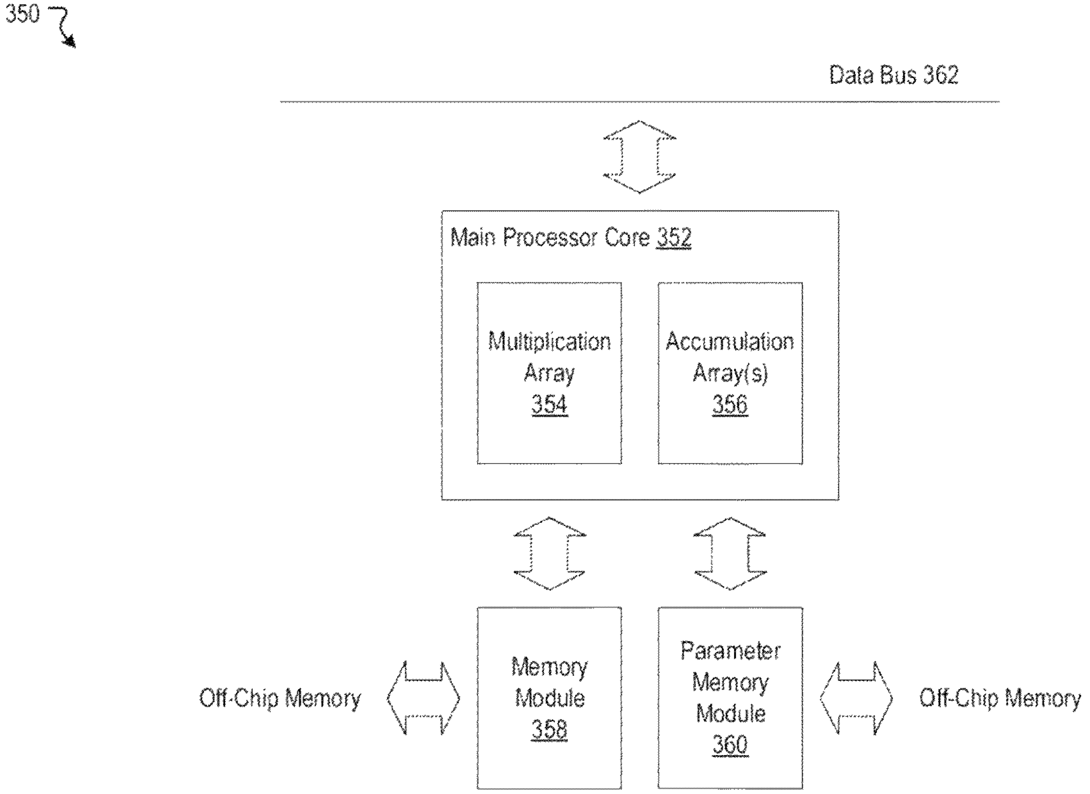
FIG. 3B illustrates a diagram of a convolutional neural network processor, according to various embodiments of the present disclosure.

FIG. 3B illustrates a diagram of a CNN processor 350, according to various embodiments of the present disclosure. In some embodiments, each of the plurality of CNN processors 210*a*-210*n* of FIG. 2 can be implemented using the CNN processor 350. As shown in FIG. 3B, in some embodiments, the CNN processor 350 can include a main processor core 352 connected or coupled to a memory module 358 and a parameter memory module 360. The main processor core 352 can be further connected or coupled to a data bus 362 (e.g., the data bus 212 of FIG. 2) of an image rendering system (e.g., the image rendering system 200 of FIG. 2). Through the data bus 362, the main processor core 352 can read and write various data to and from other processors (e.g., the plurality of MLP processors 206*a*-206*n* of FIG. 2) connected or coupled to the data bus 362. For example, the main processor core 352 can receive color and intensity data of points outputted by an MLP processor (e.g., the MLP processor 300 of FIG. 3A) through the data bus 362. The main processor core 352 can compute (or generate) detailed color and density values of the points through a convolutional neural network. In this example, the main processor core 302 can write the detailed color and density values of the points to the data bus 362 so other processors can further process the detailed color and density values to render high-frequency images.

In general, the convolutional neural network can be configured to parallelly process color and density values. For example, the convolutional neural network can simultaneously process color and density values of multiple points. A such, a number of CNN processors needed to process data can be less than a number of MLP processors. However, unlike a multilayer perceptron, parameters associated with a convolutional neural network (i.e., weights of the convolutional neural network) can be larger than parameters associated with the multilayer perceptron (i.e., weights of the multilayer perceptron). Furthermore, neural operations needed to generate detailed color and density values of points through the convolutional neural network require more computing resources than neural operations needed to generate color and density values of points through the multilayer perceptron. As such, unlike an MLP processor, the CNN processor 350 reads the parameters of the convolutional neural network from an external storage device through the data bus 362. Furthermore, it is inefficient to store the parameters associated with the convolutional neural network in the main processor core 352 which slows down computation performed by the main processor core 352. Instead, the parameters of the convolutional neural network are stored in the parameter memory module 360 to improve computational efficiency of the main processor core

352. In some embodiments, the main processor core 352 can be configured to load the parameters prior to processing. The memory module 358 is configured to store output data associated with neural layers of the convolutional neural network (e.g., detailed color and intensity values). As shown in FIG. 3B, in some embodiments, the memory module 358 and the parameter memory module 360 can be further connected or coupled to off-chip memory devices for further storage.

In some embodiments, the main processor core 352 can comprise a multiplication array 354 and one or more accumulation arrays 356. The multiplication array 354 and the one or more accumulation arrays 356 can be configured for performing matrix computational operations associated with the neural layers of the convolutional neural network. Values resulting from the matrix computational operations can be stored in the memory module 358. In general, the main processor core 352 can be used for operating an activation function and quantization function associated with matrix computations. In some embodiments, the main processor core 352 can be implemented as a computational unit, such as an arithmetic logic unit, in a central processor unit (CPU) and its associated memory or cache. In some embodiments, the main processor 352 can be implemented as a computational unit, such as a texture mapping unit, in a graphics processor unit (GPU) and its associated memory or cache. In some embodiments, the main processor 352 can be implemented using custom logic programmed into field programmable gate arrays (FPGAs) or application specific integrated circuits (ASICs). Many variations are possible. Many variations are possible. Computational steps performed by the main processor core 352 of the CNN processing unit 350 will be discussed in further detail with reference to FIG. 4B herein.

Figure 4A:
FIG. 4A illustrates a computational flow of a main processor core of a multilayer perceptron processor, according to various embodiments of the present disclosure.
Figure 4A:
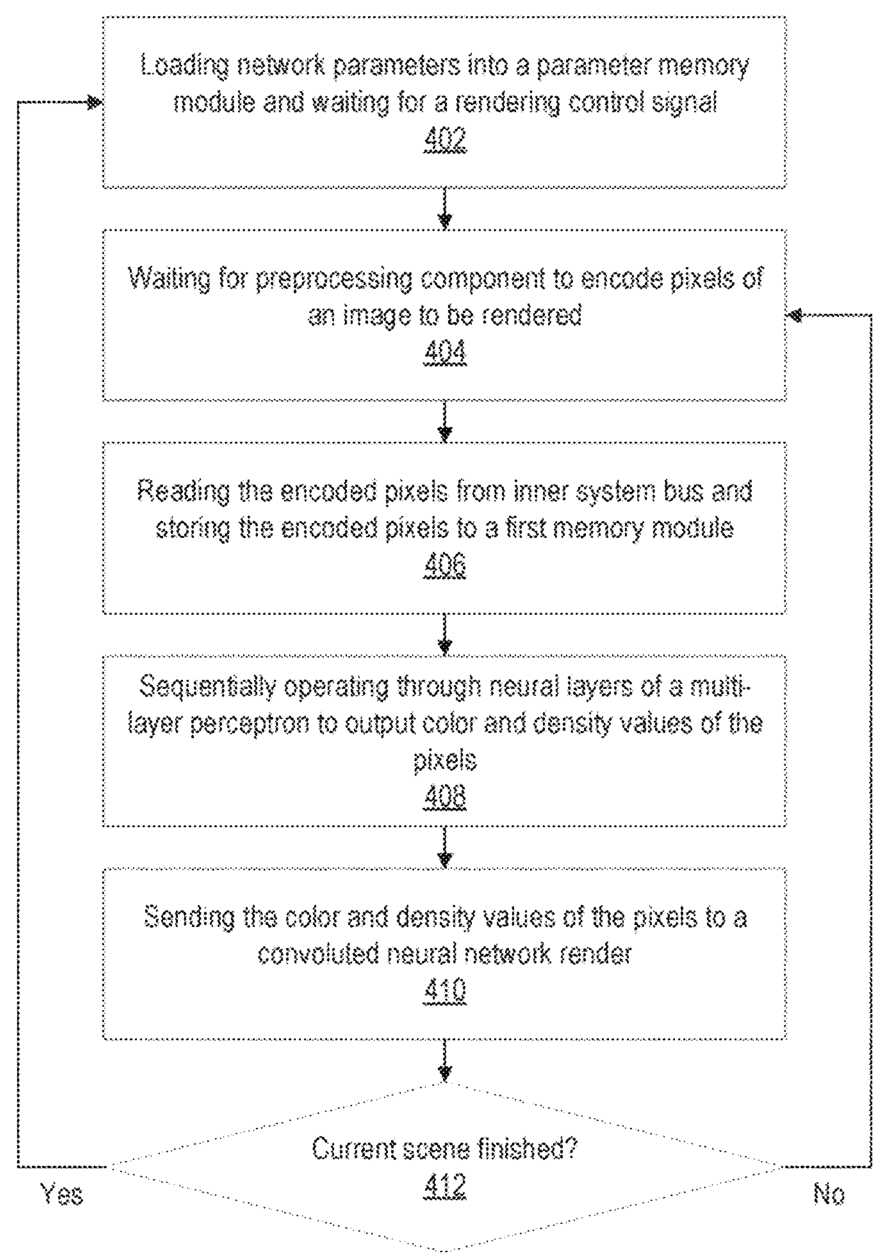

FIG. 4A illustrates a computational flow 400 of a main processor core of an MLP processor, according to various embodiments of the present disclosure. In some embodiments, the computational flow 400 can be associated with computational steps performed by the main processor 302 of FIG. 3A. As shown in FIG. 4A, the computational flow 400 can start at block 402. At block 402, the main processor core loads network parameters of a machine learning model (e.g., weights associated with a multilayer perceptron encoded with a neural radiance field) into a parameter memory module (e.g., the parameter memory module 314 of FIG. 3A). The main processor core then waits for a rendering control signal to start processing high dimensional vector representations of points and camera rays to generate (or compute) color and density values of the points along the camera rays. At block 404, the main processor core waits for a preprocessing component (e.g., the preprocessing component 252 of FIG. 2B) to provide the high dimensional vector representations. Upon receiving the high dimensional vector representations, the main processor core, at block 406, reads the high dimensional vector representations and stores the high dimensional vector representations to a first memory module (e.g., the memory module 310 of FIG. 3A). At block 408, the main processor core operates through layers of the machine learning model (e.g., neural layers of the multilayer perceptron) to compute color and density values of the points. During this process, the main processor core alternatively accesses and stores input data and output data associated with the layers of the machine learning model in a ping-pong fashion between the first memory module and a second memory module (e.g., the memory module 312 of FIG. 3A). The main processor core, upon computing the color and density values of the points, at block 410, sends the color and density values to a convoluted neural network render (e.g., the CNN processor 350 of FIG. 3B) for further processing. At block 412, the main processor core determines whether color and density values of every point associated with an image have been computed. If the main processor core determines that color and density values of every point associated with an image have been computed, the main processor core ends the computation flow 400 and waits for a next rendering control signal (i.e., "Yes" branch). If the main processor core determines that color and density values of every point associated with an image have not been computed, the main processor core continues to compute color and density values of points (i.e., "No" branch). That is, steps of blocks 404-410 are repeated until color and density values of every point are computed.

Figure 4B:
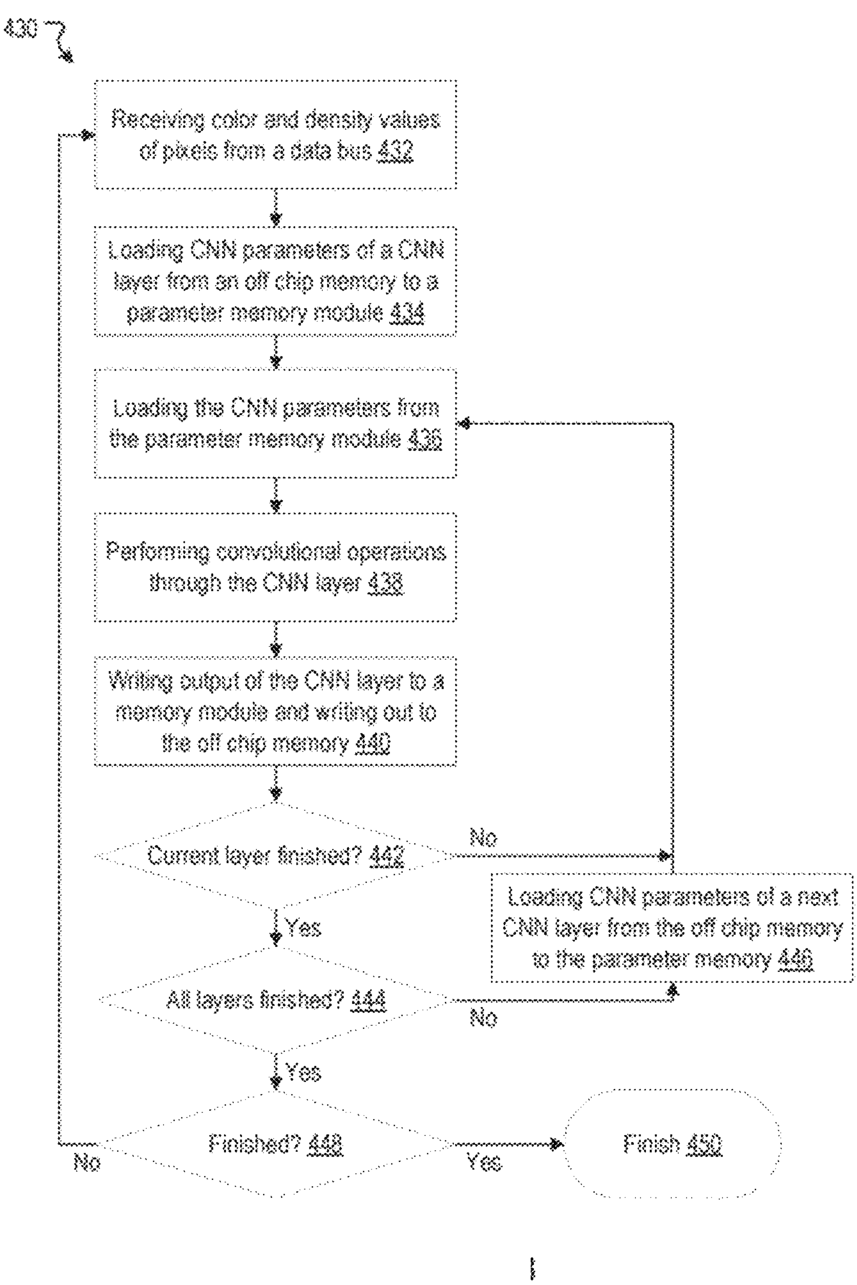
FIG. 4B illustrates a computational flow of a main processor core of a convolutional neural network core, according to various embodiments of the present disclosure.

FIG. 4B illustrates a computational flow 430 of a main processor core of a CNN processor, according to various embodiments of the present disclosure. In some embodiments, the computational flow 430 can be associated with computational steps performed by the main processor core 350 of FIG. 3B. As shown in FIG. 4B, the computational flow 430 can start at block 432. At block 432, the main processor core receives color and density values of points along camera rays associated with pixels of an image to be rendered from a data bus (e.g., the data bus 362 of FIG. 3B). The color and density values of the points can be provided by an MLP processor (e.g., the MLP processor 300 of FIG. 3A) coupled to the data bus. At block 434, the main processor core can load parameters of a convolutional neural network from an off chip memory to a parameter memory module (e.g., the parameter memory module 360 of FIG. 3B). At block 436, the main processor core loads the parameters of the convolutional neural network from the parameter memory module. At block 438, the main processor core, based on the parameters of the convolutional neural network, computes detailed color and density values of the voxels using the color and density values of the voxels provided by an MLP processor through a neural layer of the convolutional neural network. At block 440, the main processor core outputs the detailed color and density values of the points generated through the neural layer into a memory module (e.g., the memory module 358 of FIG. 3B). At block 442, the main processor core determines whether the color and density values of the points have been fully processed through the neural layer of the convolutional neural network. When the main processor core determines that the color and density values of the points have been processed through the neural layer of the convolutional neural network, at block 444, the main processor core loads parameters of a next layer of the convolutional neural network, at block 446, and continues determination of the color and density values of the points. When the main processor core determines that the color and density values of the points have been processed through all of the neural layers of the CNN, at block 448 (i.e., "Yes" branch), the computational flow 430 ends.

Figure 4C:
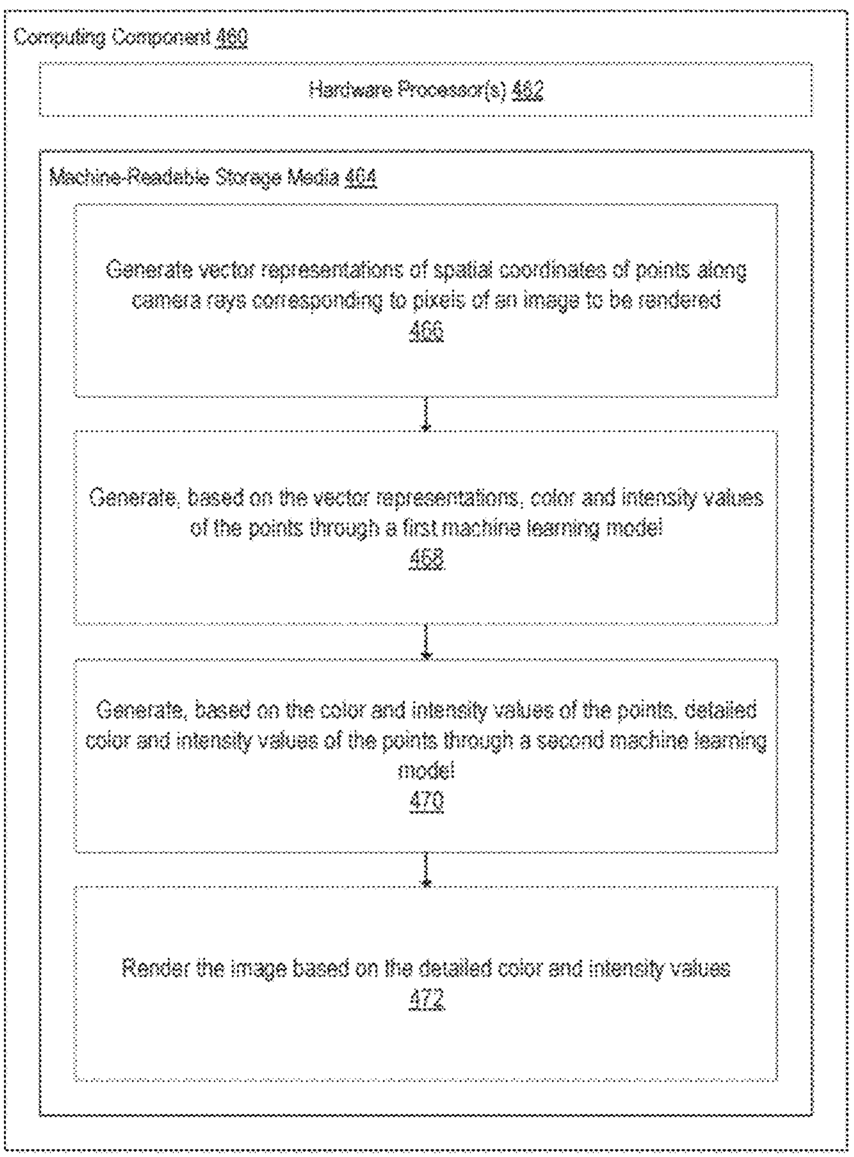
FIG. 4C illustrates a computing component that includes one or more hardware processors and a machine-readable storage media storing a set of machine-readable/machine-executable instructions that, when executed, cause the hardware processor(s) to perform a method, according to various embodiments of the present disclosure.

FIG. 4C illustrates a computing component 460 that includes one or more hardware processors 462 and a machine-readable storage media 464 storing a set of machine-readable/machine-executable instructions that, when executed, cause the hardware processor(s) 462 to perform a method, according to various embodiments of the present disclosure. The computing component 460 may be, for example, the computing system 500 of FIG. 5. The hardware processors 462 may include, for example, the processor(s) 504 of FIG. 5 or any other processing unit described herein. The machine-readable storage media 464 may include the main memory 506, the read-only memory (ROM) 508, the storage 510 of FIG. 5, and/or any other suitable machine-readable storage media described herein.

At block 466, the processor 462 can generate vector representations of spatial coordinates of points along camera rays corresponding to pixels of an image to be rendered.

At block 468, the processor 462 can generate, based on the vector representations, color and intensity values of the points through a first machine learning model.

At block 470, the processor 462 can generate, based on the color and intensity values of the points, detailed color and intensity values of the voxels through a second machine learning model.

At block 472, the processor 462 can render the image based on the detailed color and intensity values.

The techniques described herein, for example, are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination.

Figure 5:
FIG. 5 is a block diagram that illustrates a computer system upon which any of various embodiments described herein may be implemented.
Figure 5:
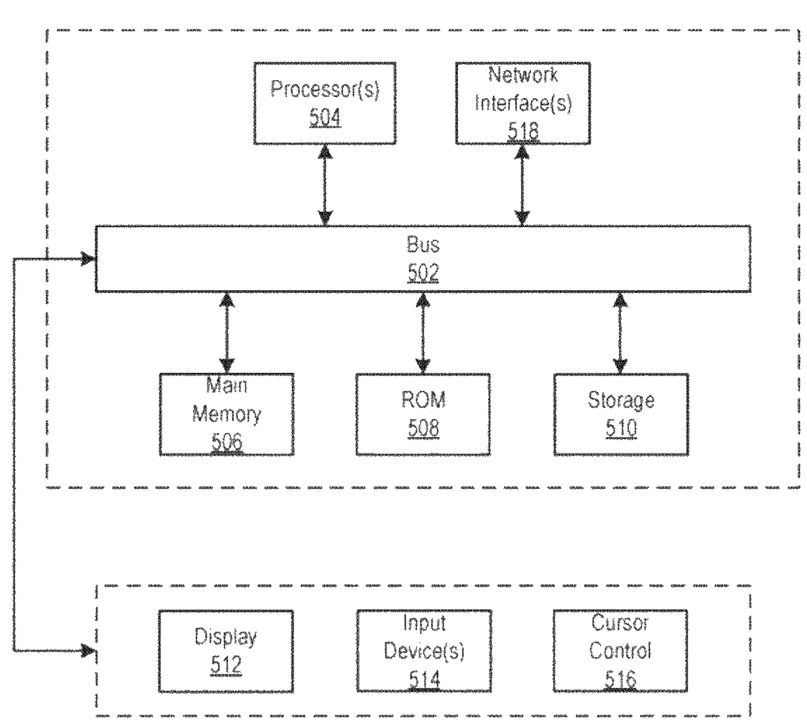

FIG. 5 is a block diagram that illustrates a computer system 500 upon which any of various embodiments described herein may be implemented. The computer system 500 includes a bus 502 or other communication mechanism for communicating information, one or more hardware processors 504 coupled with bus 502 for processing information. A description that a device performs a task is intended to mean that one or more of the hardware processor(s) 504 performs.

The computer system 500 also includes a main memory 506, such as a random access memory (RAM), cache and/or other dynamic storage devices, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions.

The computer system 500 further includes a read only memory (ROM) 508 or other static storage device coupled to bus 502 for storing static information and instructions for processor 504. A storage device 510, such as a magnetic disk, optical disk, or USB thumb drive (Flash drive), etc., is provided and coupled to bus 502 for storing information and instructions.

The computer system 500 may be coupled via bus 502 to output device(s) 512, such as a cathode ray tube (CRT) or LCD display (or touch screen), for displaying information to a computer user. Input device(s) 514, including alphanumeric and other keys, are coupled to bus 502 for communicating information and command selections to processor 504. Another type of user input device is cursor control 516. The computer system 500 also includes a communication interface 518 coupled to bus 502.

Unless the context requires otherwise, throughout the present specification and claims, the word "comprise" and variations thereof, such as, "comprises" and "comprising" are to be construed in an open, inclusive sense, that is as "including, but not limited to." Recitation of numeric ranges of values throughout the specification is intended to serve as a shorthand notation of referring individually to each separate value falling within the range inclusive of the values defining the range, and each separate value is incorporated in the specification as it were individually recited herein. Additionally, the singular forms "a," "an" and "the" include plural referents unless the context clearly dictates otherwise. The phrases "at least one of," "at least one selected from the group of," or "at least one selected from the group consisting of," and the like are to be interpreted in the disjunctive (e.g., not to be interpreted as at least one of A and at least one of B).

Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment, but may be in some instances. Furthermore, the particular features, structures, or characteristics may be combined in any suitable manner in one or more embodiment.

A component being implemented as another component may be construed as the component being operated in a same or similar manner as the another component, and/or comprising same or similar features, characteristics, and parameters as the another component.

What we claim is:

1. A computing system for rendering images comprising:
a preprocessing unit coupled to a feature extract unit and a color rendering unit over a data bus, wherein:
the preprocessing unit is configured to generate vector representations of spatial coordinates of sample points along camera rays corresponding to pixels of an image to be rendered;
the feature extract unit is configured to generate a feature map of the image based on the vector representations, color and intensity values of the sample points through a first machine learning model; and
the color rendering unit is configured to render the image based on the feature map through a second machine learning model, wherein the first machine learning model is different from the second machine learning model,
wherein the feature extract unit comprises a plurality of first processors,
wherein each of the plurality of first processors comprises:
a first processor core coupled to two memory modules and a parameter memory module, wherein:
the first processor core performs matrix operations associated with the first machine learning model:
the two memory modules store input data and output data associated with the first machine learning model; and
the parameter memory module stores parameters associated with the first machine learning model.

2. The computing system according to claim 1, wherein a first signal to noise ratio (SNR) of the feature map is lower than a second signal to noise ratio (SNR) of the rendered image.

3. The computing system according to claim 1, wherein the feature map comprises a coarse image, and a first signal to noise ratio (SNR) of the coarse image is lower than a second signal to noise ratio (SNR) of the rendered image.

4. The computing system according to claim 3, wherein the rendered image comprises high-frequency features not presented in the coarse image.

5. The computing system according to claim 1, wherein the first machine learning model is a multilayer perceptron.

6. The computing system according to claim 1, wherein the second machine learning model is a convolutional neural network.

7. The computing system according to claim 1, wherein the two memory modules alternatively store input data and output data associated with layers of the first machine learning model.

8. The computing system according to claim 7, wherein the first processor core comprises a multiplication array, one or more accumulation arrays, and a local cache, wherein:

the multiplication array and the one or more accumulation arrays perform matrix multiplication operations associated with the layers of the first machine learning model; and the local cache stores partial sums associated with the matrix multiplication operations.

9. The computing system according to claim 1, wherein the first processor core is a computational unit associated with at least one of a central processor unit, a graphics processor unit, or a field programmable gate array.

10. The computing system according to claim 1, wherein the color rendering unit comprises a plurality of second processors.

11. A computing system for rendering images comprising:

a preprocessing unit coupled to a feature extract unit and a color rendering unit over a data bus, wherein:

the preprocessing unit is configured to generate vector representations of spatial coordinates of sample points along camera rays corresponding to pixels of an image to be rendered;

the feature extract unit is configured to generate a feature map of the image based on the vector representations, color and intensity values of the sample points through a first machine learning model; and the color rendering unit is configured to render the image based on the feature map through a second machine learning model, wherein the first machine learning model is different from the second machine learning model, wherein the color rendering unit comprises a plurality of processors, wherein each of the plurality of processors comprises:

a processor core coupled to a memory module and a parameter memory module, wherein:

the processor core performs matrix operations associated with the second machine learning model;

the memory module stores input data and output data associated with the second machine learning model; and the parameter memory module stores parameters associated with the second machine learning model.

12. The computing system according to claim 11, wherein the memory module stores input data and output data associated with layers of the second machine learning model.

13. The computing system according to claim 12, wherein the processor core comprises a multiplication array and one or more accumulation arrays, wherein the multiplication array and the one or more accumulation arrays perform matrix multiplication operations associated with the layers of the second machine learning model; and wherein partial sums associated with the matrix multiplication operations are stored in the memory module.

14. The computing system according to claim 11, wherein the processor core is a computation unit associated with at least one of a central processor unit, a graphics processor unit, or a field programmable gate array.

* * * * *